Patented June 17, 1941

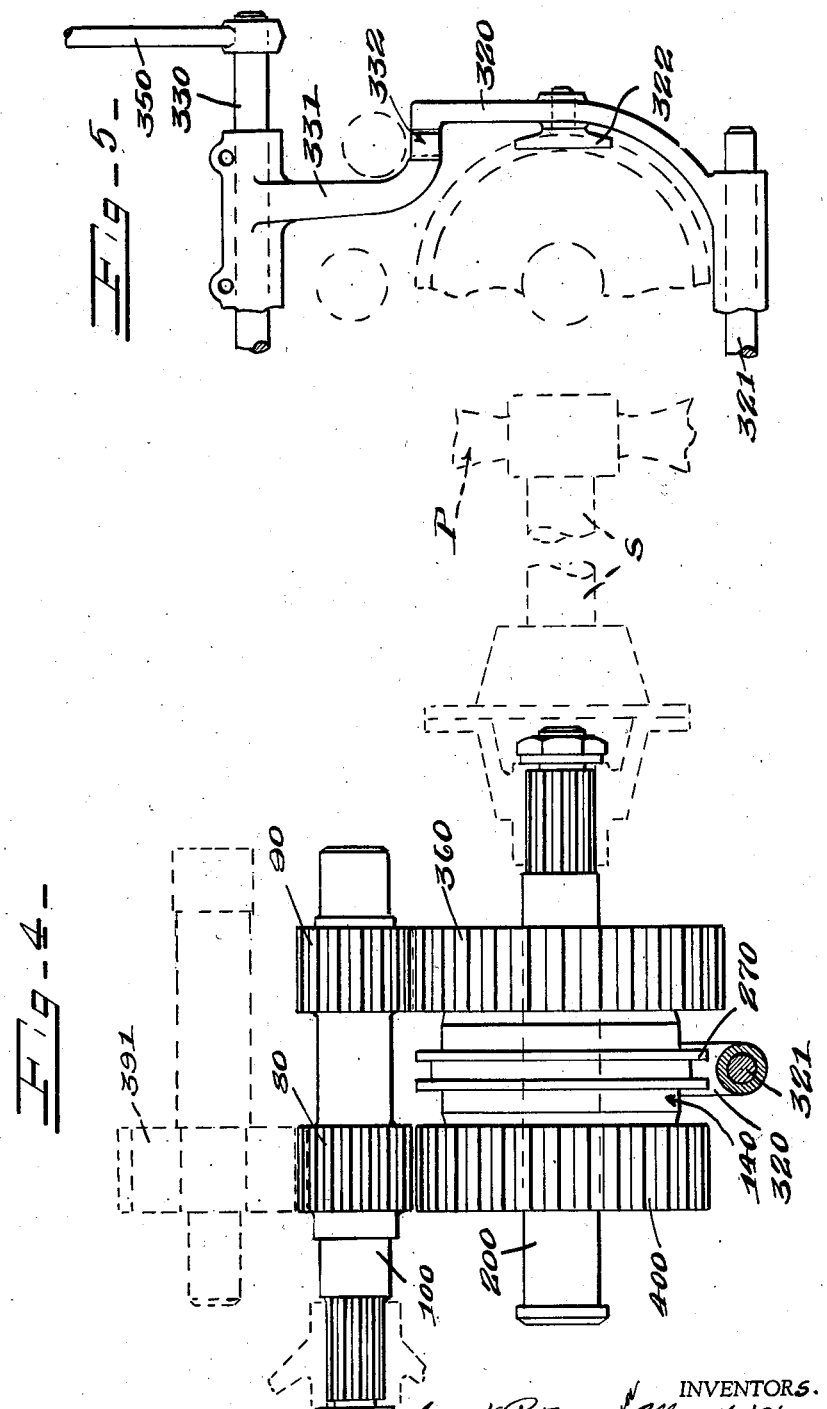

2,245,815

UNITED STATES PATENT OFFICE 2,245,815

TRANSMISSION GEARING

Carl D. Peterson and Albert H. Deimel, Toledo, Ohio

Application December 13, 1938, Serial No. 245,442

1 Claim. (Cl. 170—135.5)

This invention relates to marine transmission mechanisms, and has for its object a transmission gearing in which a change may be made from forward to reverse or vice-versa by shifting a jaw clutch out of one engaged position in which it produces, say forward speed of the marine propeller, into neutral, and into the other engaged position to produce reverse speed of the marine propeller, without disconnecting the input shaft of the gearing from the engine.

In marine reverse gearing of the planetary type, brake bands are used for applying forward or reverse gear. These bands must be capable of holding the equivalent of full engine torque. A counter shaft type of gear box may be used for reversing the drive by providing two friction clutches capable of holding the engine torque, one for forward and one for reverse, or a master or engine clutch between the engine and the gear box with two synchronized jaw clutches.

This invention has for its object a construction by which the characteristics of a marine propeller are utilized to use a forward and reverse gear box having jaw clutches and friction clutches or synchronizers not large enough to carry full engine torque to first stop the output shaft to which the marine propeller is connected, reverse its movement and speed up the rotation to that of the input shaft without providing a master or engine clutch in the drive line or without operating such a clutch, if used, preferably by first decelerating the engine.

The torque to drive a propeller in water varies as the square of the speed, and the efficiency of the propeller as a turbine or when "windmilling" is almost nil. The invention is applicable to any drive for an actuated element having the characteristics of a marine propeller.

The invention consists in the novel features and in the combinations and constructions hereinafter set forth and claimed.

In describing this invention, reference is had to the accompanying drawings in which like characters designate corresponding parts in all the views.

Figures 3 is a fragmentary view of the clutch showing the block-out mechanism for holding the jaw clutch faces from being brought into engagement until the speed of the output shaft to which the marine propeller is connected, is equal to that of the engine shaft actuating the input shaft.

Figure 4 is a diagrammatic view of another form of the gearing.

Figure 5 is a fragmentary view of the shifting mechanism for the gearing shown in Figure 4.

Figure 1:
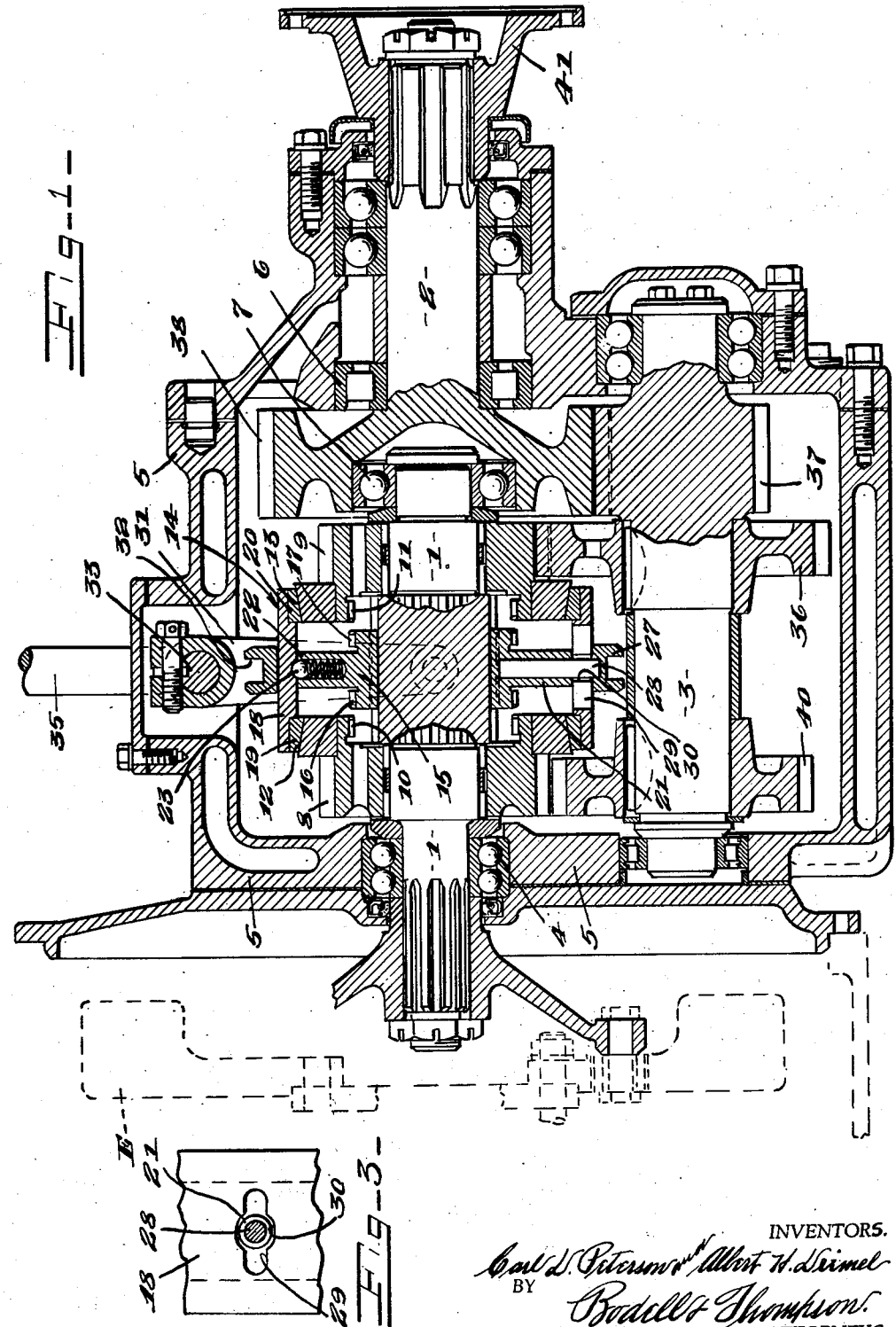
Figure 1 is a sectional view of a transmission gearing embodying this invention.

In the illustrated embodiment of this invention, 1 designates the drive or input shaft; 2 the driven or output shaft; and 3 an intermediate or counter shaft. However, the shaft 3 may be used as the output shaft, as in Figure 4.

The drive or input shaft 1 is suitably mounted in a bearing 4 in one end wall of a suitable gear box 5. The driven or output shaft 2 is suitably mounted in a bearing 6 in the rear end wall of the gear box 5 in axial alinement with the drive or input shaft 1, there being a bearing 7 interposed between the rear end of the drive shaft 1 and the front end of the driven or output shaft 2 or a gear thereon. The intermediate or counter shaft 3 is also mounted in suitable bearings in the end walls of the gear box.

The gear box is formed with a water jacket, as this transmission is primarily intended for marine work.

The shaft 1 may be coupler directly to the fly wheel E of the engine or be coupled thereto through the usual engine clutch. If an engine clutch is employed, it is not necessary to disengage it during shifting from forward to reverse, and vice-versa.

8 and 9 designate respectively, a pair of gears mounted on the input shaft 1 to normally permit relative rotation of the input shaft 1 and said gears. These gears are provided respectively with jaw or toothed clutch faces, as internal teeth 10, 11, and usually also with friction clutch faces at 12 and 13. 14 designates generally, the clutch for clutching either the gears 8 or 9 to the input shaft. This clutch includes a positive or toothed clutch section or member 15 and also a friction clutch section, the positive section 15 being splined on the drive shaft 1 between the gears 8, 9 and having toothed or jaw clutch faces 16, 17 on opposite sides thereof shiftable into engagement respectively with the clutch faces 10 and 11 of the gears 8 and 9.

18 designates the friction clutch section shiftable with the member or section 15 and also permitting axial shifting of the section 15 relative to the section 18, the section 18 being a sleeve having friction faces 19 and 20 at its opposite ends for coacting with the friction clutch faces 12 and 13 of the gears 8, 9 respectively. The section or sleeve 18 is mounted on radial projections or posts 21 and 22 on the member or section 15. In said posts 22, spring-pressed poppets, as 23, are provided which normally thrust into a cam-shaped internal groove in the sleeve 18 for causing the sleeve 18 to shift as a unit with the member 15 until the friction clutch face 19 or 20 engages the friction clutch face 12 or 13, and then permitting continued axial shifting of the member or section 15 to bring the jaw face 16 into engagement with the clutch face 10 of the gear 8 or the jaw face 17 into engagement with the face 11 of the gear 9. The clutch is shifted by means of a collar 27 surrounding the sleeve and coupled to the post 21 by pins 28, these pins extending through lengthwise slots 29 in the sleeve 18. These slots are of a form similar to that shown in Figure 3 and permit the relative axial movement of the toothed member or section 15 and the friction or sleeve section 18. The slots are wider at 30 at their central portions to permit relative rotary movement, within limits, of the sleeve 18 and member 15 and block out engagement of the jaw faces until the speed of the propeller shaft builds up through the friction clutch section to that of the input shaft. The construction of the clutch 14 per se forms no part of the invention.

Figure 2:
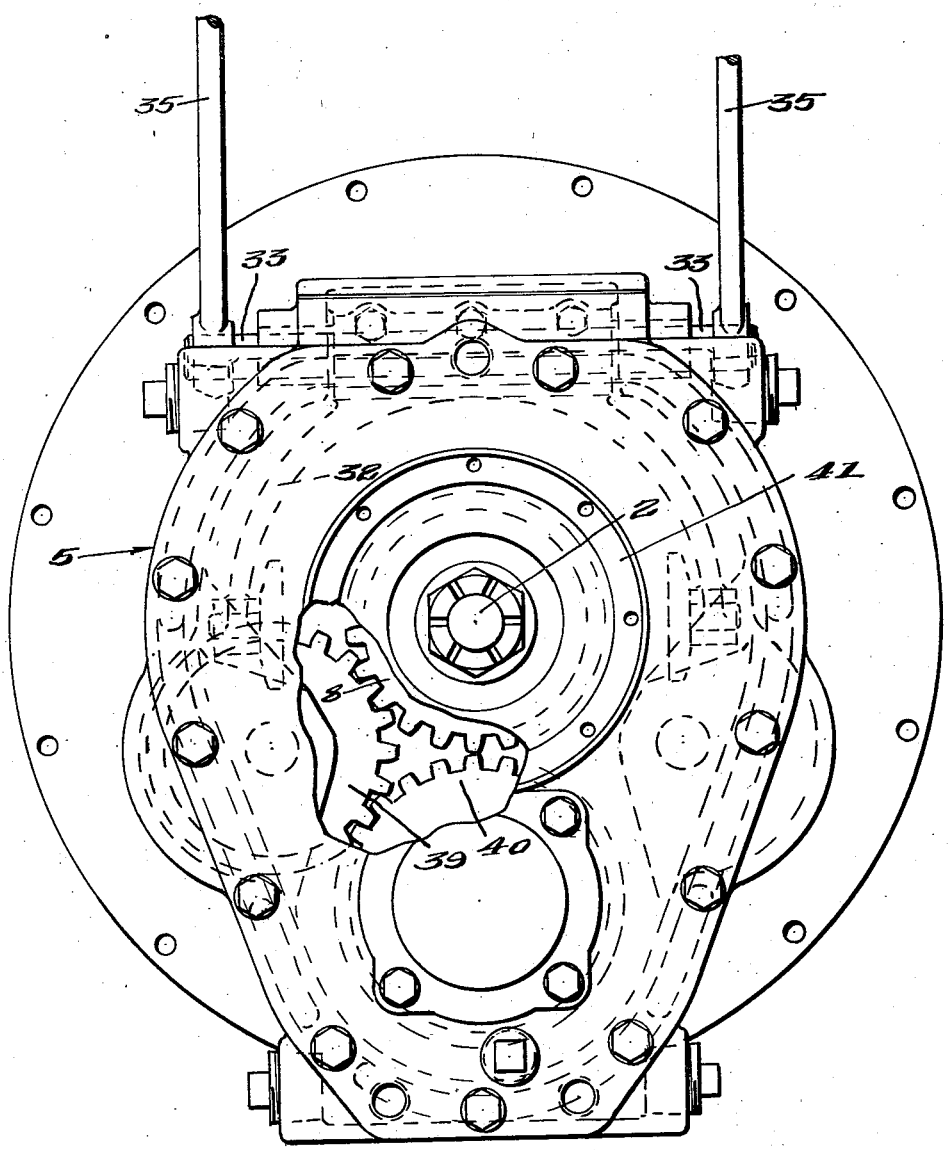
Figure 2 is an elevation, partly in section, looking to the left in Figure 1.

31 designates a shifting fork working in the groove 32 of the collar 27. The fork, as here shown in Figures 1 and 2, is mounted on a rock shaft 33 suitably mounted in the top of the gear box and operable by a shifting lever 35. As here illustrated, the shaft is provided with shifting levers 35 on its opposite ends for convenience in operating from either side of the boat in which the transmission mechanism is installed.

The gear 9 meshes directly with a gear 36 keyed to the countershaft 3 and the countershaft has a gear 37 thereon meshing with a gear 38 on the inner end of the driven or output shaft 2. The gear 36, shaft 3, gears 37 and 38 constitute a forward train of gears between the gear 9 and the output shaft 2 or the gear 36 constitutes a gearing between the gear 9 and the shaft 3, when the shaft 3 is the output shaft.

The gear 8 meshes with an intermediary gear 39 (Figure 2) suitably mounted in the gear box and meshing with a gear 40 keyed to the countershaft 3 and constitutes reverse train of gearing between the gear 8 and the shaft 3 or the gears 39 and 40 constitute gearing between the gear 8 and shaft 3 when the shaft 3 is the output shaft. Preferably, there are duplicate gears 39 meshing with opposite sides of the gear 8 and the gear 40.

The driven or output shaft 2 is provided with a suitable coupling 41 for connection to the propeller shaft of the boat, on which shaft a propeller, as P (Figure 4) is mounted, but the shaft may be omitted, and the shaft 3 provided with an extension and the coupling, as 41 (Figure 4).

In Figure 4, 100 and 200 designate the engine driven input shaft and the output shaft connected through a suitable coupling to the propeller shaft S on which the marine propeller P is mounted.

In the construction shown in Figure 1, this propeller shaft S is connected through the coupling 41 to the output shaft 2. 80 and 90 designate gears of the reverse and forward trains corresponding to the gears 8 and 9 of the gearing shown in Figure 1. The reverse train includes the gears 391 and 400 and the forward train a gear 360 meshing with the gear 90.

140 designates the clutch corresponding to the clutch 14 and being of substantially the same construction. This clutch 140 is shiftable by mechanism similar to that shown in Figure 2, that is, by a lever 350 mounted on the rock shaft 330 and carrying a rock arm 331 having a pivotal connection at 332 with a shifting fork 320 pivotally mounted on a rod 321 in the lower part of the gear box and having a shoe or block 322 working in the slot of the collar 270 of the clutch 140. In Figure 5, one half only of the shifting mechanism is shown, the other half is a duplicate of that shown.

Shifting of the clutch 140 to the right (Figure 4) clutches the gear 360 to the output shaft 200 so that the forward drive is through the gears 90 and 360. Shifting of the clutch 140 to the left clutches the gear 400 to the output shaft 200 so that the reverse drive is through gears 80, 390 and 400.

In operation, the throttle of the engine is closed or the engine decelerated. The propeller P then tends to drive the engine but as the efficiency of the propeller as a turbine or when "windmilling" is small, the torque produced is almost nil. The gear shift lever 34 or 350 is now shifted to neutral, and by further movement through neutral, the friction face 19 and the friction clutch section 18 engages the friction section of the gear 8, so that through this frictional engagement, the propeller P is first stopped, then its direction reversed, and its reverse rotation speeded up until its speed in reverse corresponds to the engine idling speed through the reverse train of gears. This operation takes place due to the characteristics of the marine propeller that the torque taken by the propeller under this condition is small. For example, if the engine idling speed is one-fourth of its full speed, then the torque will be one-sixteenth of the full torque. Thus a comparatively small sized synchronizer or friction clutch may easily handle the torque of the marine propeller during the change from forward to reverse, or vice-versa. When the speeds are thus built up through the friction clutch, the jaw clutch may be brought into engagement as it is no longer blocked out of engagement by the pins 28 binding on the wider portion 30 of the slots 29 and the engine may be speeded up and full torque applied through the jaw clutch section. The operation is the same when a shift is being made from reverse to forward speed, except that the forward speed is obtained by shifting the clutch 14 or 140 into engagement with the gear 9 or 90.

By this invention, owing to the characteristics of a marine propeller, the gear shifts may be made without a friction clutch capable of carrying the full torque of the engine. It will be understood that the gearing may be used in other situations where the driven part has characteristics similar to those of a marine propeller.

What we claim is:

The combination of an engine actuated driver, a propeller having the characteristics of a marine propeller, a propeller shaft, and a transmission gearing including an input shaft connected to the driver, an output shaft connected to the propeller shaft, reverse and forward gear trains between the input and output shafts, and a clutch shiftable in one direction from neutral to clutch the forward gear train in driving connection with the input and output shafts and in the opposite direction to connect the reverse train in driving connection with the input and output shafts, the clutch including jaw sections and friction sections rotatable and shiftable with the jaw sections and frictionally coacting with the gear of each of said trains in advance of the engagement with the jaw section, the friction sections being capable of transmitting torque from the input to the output shaft through the gear train and being constructed to have only sufficient friction to overcome the driving action of the propeller under the influence of the propeller being dragged or pushed, which propelling effect tends to drive the propeller shaft, and less than enough friction to transmit full torque of the driver at engine idling speed, the clutch also including means for blocking out engagement of the jaw sections until the output shaft and the propeller shaft have been reversed through one or the other of the friction clutches and the speeds of the parts to be clutched together by the jaw clutches synchronized, when shifting into forward gear from reverse or into reverse from forward speed, all without declutching the input shaft from the engine actuated driver.

CARL D. PETERSON.
ALBERT H. DEIMEL.